May 9, 1933.  H. JANDER  1,907,972
CLUTCH OPERATING MEANS
Filed April 24, 1929
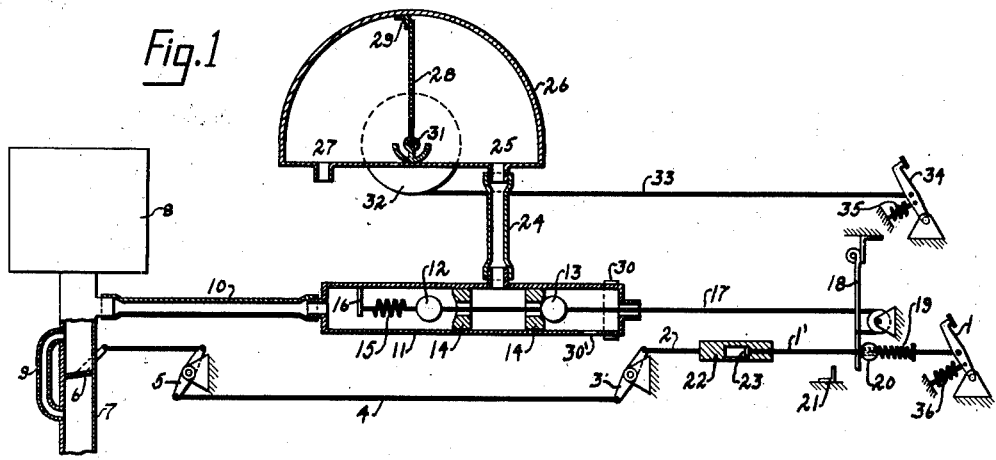
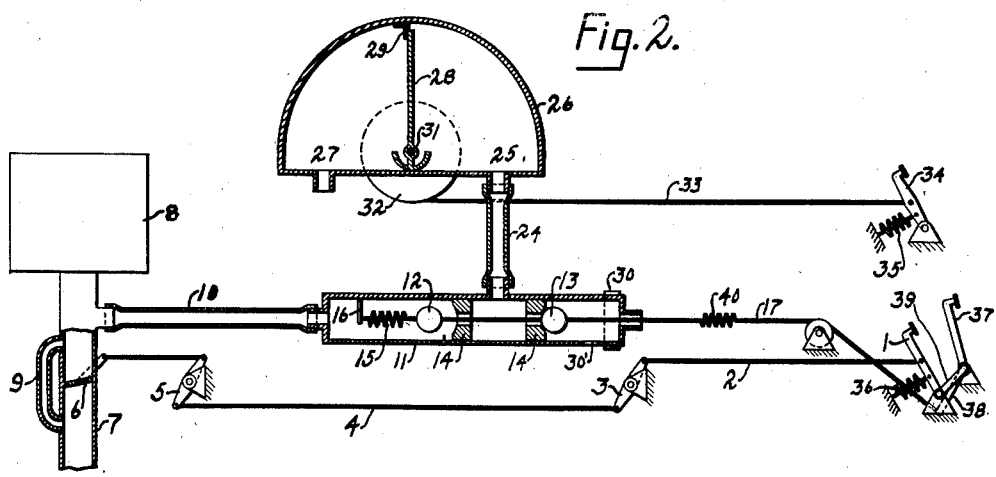
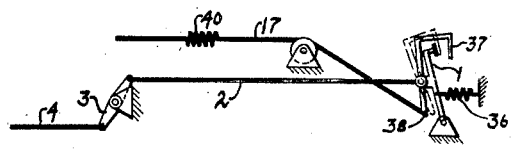
INVENTOR
Hans Jander
BY
ATTORNEYS.

Patented May 9, 1933

1,907,972

UNITED STATES PATENT OFFICE

HANS JANDER, OF BERLIN, GERMANY

CLUTCH OPERATING MEANS

Application filed April 24, 1929, Serial No. 357,644, and in Germany December 11, 1928.

This invention relates to means for operating the clutch of motor vehicles and, briefly stated, the vacuum in the intake manifold created by the motor is utilized for operating the clutch, the operation of the mechanism being governed by a valve-system which may be operated directly or indirectly by the accelerator or independently thereof.

The device is of such character that it may be installed in old and new vehicles of any design and of any size, so as to be accessible and to permit of inspecting all parts of the motor.

One of the primary objects of the invention is to provide a clutch operating means which is inexpensive and requires a small space for its installation.

I have schematically shown in the accompanying drawing, some forms of my invention which are at present preferred by me since they will give in practice satisfactory and reliable results, although it is to be understood that the various instrumentalities employed can be variously arranged and organized and that my invention is not limited to the precise arrangement and organization of these instrumentalities shown and described.

In the drawing—

Fig. 1 is a diagrammatic view, partly in section, illustrating the application and operation of one form of the invention;

Fig. 2 is a similar view illustrating a modification of the invention; and

Fig. 3 is a fragmentary view of still another modification.

Referring to Fig. 1 of the drawing, the usual accelerator pedal 1 is connected by the rod-system 2, 3, 4 and 5 with the throttle 6 of the intake 7 leading from the carburetor
8. The throttle is by-passed by the relatively small tube 9, so that a small quantity of fuel is supplied to the motor even if the throttle 6 is closed. The quantity of fuel is such that the motor can be started but cannot accelerate the vehicle.

The fuel supply pipe 7 is connected with the valve-chamber 11 of the clutch operating means, by the pipe 10, which is preferably of elastic material—at a point immediately behind the throttle 6. In this chamber are two ball-valves 12, 13, the seats 14—14 of which are made of rubber or other elastic material and fixed in the chamber 11. The valves 12 and 13 are mounted on the cable 17 and valve 12 is connected with a cross-beam 16 by a spring 15 which has a tendency to keep the valves in the position shown. Both valves 12 and 13 are thus connected with each other and, therefore, they are always moved simultaneously either by the tension of the spring 15 or by the force transferred with the aid of the rope 17 from the accelerator 1 as will be described. The cable 17 is connected to the lever 18, which is adapted to be shifted on movement of the accelerator through the medium of the spring 19 and the bored ball 20. The movement of the lever 18 is limited by the stop 21.

As seen from the drawing the pushing rod 2 of the accelerator rod-system is subdivided. Both parts are surrounded by the lost motion socket 22 which is fixed to one of the parts while the other one is guided therein, its longitudinal motion being limited by a stop 23.

A pipe 24, preferably of elastic material, branches from the valve-chamber 11 between the two valve seats 14, this pipe leading into the vacuum chamber 25 of the casing 26. The chamber 25 is separated from the chamber 27 by means of a swinging flap 28, which is provided with a leather sealing strip 29 for obtaining a perfect joint. The chamber 27 has communication with the atmosphere and so does the right hand end of the chamber 11 as indicated at 30'. The opening 30' of the valve chamber can be more or less closed by means of a ring member 30 or any other throttling device.

The swinging flap 28 rotates the shaft 31, which, outside of the casing 26, is provided with a rope-pulley 32. A rope or the chain 33 is fastened to this pulley and connected at its other end to the clutch pedal 34. The clutch-pedal as well as the accelerator 1 are kept in the position illustrated by means of springs 35, 36, respectively.

The operation is as follows:

When the motor is started or idling only a small amount of fuel is led through the small by-pass 9 and supplied to the cylinders, while the throttle 6 is closed. A vacuum is thus created and the air in line 10, the valve chamber and the chamber 25 is drawn out. In consequence, the swinging flap 28 is turned to the right. This rotates the pulley 32 so that the rope 33 is wound on the pulley and the clutch-pedal 34 is drawn down against the pressure of the spring 35, disconnecting the clutch. Shifting of the usual gears may then be done.

When the accelerator 1 is operated both the pieces of the pushing-rod 2 come in contact with each other and the rod-system 3—5 opens the throttle 6. But prior to this, owing to the lost motion connection device 22, the spring 19 pushes forward the lever 18 with the aid of the freely movable ball 20 so that the balls 12, 13 are moved to the right. As soon as the valve 13 has reached its seat, the further movement of the lever 18 is interrupted by the stop 21. The arrangement is such that at the moment the throttle 6 starts to open itself, the valve 12 is closed and the valve 13 is opened. The valve 13 thus allows the atmosphere to enter the vacuum-chamber 25 so that the clutch-pedal 34 is pressed back by the spring 35 and the clutch is engaged.

As soon as it is necessary or desirable to make another gear shift, the foot is taken off the accelerator and spring 15 returns the valves to position. The vacuum created then effects the disconnection of the clutch in the described manner.

It is easily to be understood that by the installation of this mechanism, the operation of the clutch-pedal by the driver becomes unnecessary, although he may use it at will.

Referring to Fig. 2, the embodiment of my invention shown therein generally corresponds to that of Fig. 1. It will be seen, however, that the rope 17 is connected to a special pedal 37 at an extension 38 thereof, and that this pedal and the accelerator 1 are pivotally mounted on a common pin 39. A spring 40 is provided in the rope 17 and the pushing rod 2 is not subdivided. The pedal 37 and the accelerator 1 are so arranged that the driver can only operate the accelerator 1 after he has put his foot upon the pedal 37 and pushed the same somewhat forward. This prior motion of the pedal 37 effects the closing of valve 12 and the opening of valve 13, and the clutch 34 is engaged. In the opposite direction the accelerator returns to idling position and then the lever 37 returns to the position shown and the clutch disengaged.

The same result is obtained by the construction illustrated in Fig. 3 wherein the pedal 37 is pivotally mounted on the accelerator 1.

What I claim is:—

1. In an automotive vehicle having a motor, carbureter, intake from carbureter to motor, clutch pedal and throttle operating means, the combination of a power cylinder and its movable element, a connection between said cylinder and the intake at a point between the carbureter and the motor, an operating connection between the movable element and the clutch pedal, valve means normally establishing communication between the intake and the power cylinder in one position and movable to another position to cut off said communication and provide communication between the cylinder and the atmosphere, and pedal means in advance of the throttle operating means for moving the valve whereby said last two means are operated sequentially.

2. In combination in an automotive vehicle having clutch and throttle operating pedals and a fuel supply pipe, a servo-motor connected to the clutch pedal; valve means comprising a cylinder, two apertured valve seat members in spaced relation in said cylinder, two ball valves adapted to seat in said members and block the apertures therein, and means to support said ball valves in operative position; and a conduit from the supply pipe to one end of said valve cylinder, and from said valve cylinder to said servo-motor.

3. In combination in an automotive vehicle having clutch and throttle operating pedals and a fuel supply pipe, a servo-motor connected to the clutch pedal; valve means comprising a cylinder, two apertured valve seat members in spaced relation in said cylinder, two ball valves adapted to seat in said members and block the apertures therein, and means operative to yieldingly support said ball valves in operative relation; and a conduit from the supply pipe to one end of said cylinder and from a point in said cylinder intermediate the valve seats to the servo-motor.

4. In combination in an automotive vehicle having clutch and throttle operating pedals and a fuel supply pipe, a servo-motor connected to the clutch pedal; valve means comprising a cylinder, two apertured valve seat members in spaced relation in said cylinder, two ball valves adapted to seat in said members and block the apertures therein, a spring in said cylinder, and a cable attached at one end to said spring and at its other end to the accelerator pedal, and having said ball valves fixed thereon and carried thereby; and a conduit from the supply pipe to one end of said cylinder and from a point in said cylinder intermediate the valve seats to the servo-motor.

5. In automatic clutch operating mechanism, a source of vacuum; a vacuum cylinder and piston mechanism; valve means for said mechanism comprising a valve chamber, a pair of aligned spaced valve seats in said chamber, a pair of valves adapted to seat in said valve seats, and means for supporting said valves in operative position; means communicably connecting the source of vacuum with said valve chamber; and means communicably connecting said valve chamber with said cylinder and piston mechanism.

In testimony whereof I affix my signature.

HANS JANDER.